UNITED STATES PATENT OFFICE 2,319,883

WATER SOLUBLE ADHESIVE

Bradford S. Ritchie, Norwood, Mass., assignor to
Ralph W. E. Leach, Winchester, Mass.

No Drawing. Application filed November 7, 1940,
Serial No. 364,687

5 Claims. (Cl. 106—123)

This invention relates to improvements in water-soluble adhesives.

More particularly it relates to the utilizing, for adhesive, sizing, stiffening or other purposes, of the blown-down liquid obtained in manufacture of sulphite pulp in the paper industry. When the ligneous matter in this liquor has been concentrated by aqueous evaporation the concentrate is a water-soluble thermoplastic composition which the invention converts into a product of permanent utility and which makes the liquor a satisfactory source of composition for the purposes indicated.

Prior proposals for utilizing the ligneous matter of sulphite liquor to make adhesives and the like have produced compounds whose adhesion would gradually diminish, with lapse of time; and which would have, or would develop, an obnoxious odor. In some such proposals the chemical composition has been such that the compound is insoluble in water; and in some a crystalline formation occurs, destroying the continuity and strength of the adhesive film.

It is an object of the present invention to provide a product of the sulphite blow-down liquor which is a water-soluble adhesive free from the above defects.

One feature of the invention resides in the treating of the liquor so that the ligneous material in it no longer will support microscopic life in the nature of fungus. With the elimination of fungus attack I have found that the product no longer develops the characteristic and obnoxious odors which have been incidents of prior compositions of this general nature, and which have militated against general or extensive use of adhesives made from sulphite liquor.

In consequence of these improvements it becomes practicable and efficient to utilize the inexpensive sulphite liquor, which is now a waste and deleterious product, as the principal substance in an adhesive which can be an effective substitute for the currently used adhesives which are more expensive.

The invention attains the mentioned objects and other advantageous results by converting the sulphite liquor, or a concentration of it, into a neutralized or slightly alkaline state, introducing a suitable hygroscopic agent which is to remain for holding a predetermined measure of moisture in the finished product, and introducing a suitable fungicide. It is my belief that in previously proposed adhesives of similar origin, it is fungus growth, germinated from exposure to atmosphere, which has biologically introduced slowly into the adhesive composition products which have gradually acidified the adhesive and led to crystallization, and so the fungus has gradually diminished the adhesive quality. The process herein described makes a thermoplastic composition having superior qualities for adhesion and for sizing. The product is homogeneous, infinitely water-soluble, pliable and workable, with coherent strength comparable to if not surpassing that of the animal and fish glues now available.

To perform the process, a suitable concentrate of the sulphite liquor may be made from the waste sulphite liquor in any customary or satisfactory manner, as by evaporating its aqueous content. A concentrate having 30 to 50 per cent ligneous matter (dry basis) may be neutralized or be brought to slight alkalinity by addition of an alkalizing agent which should be one that does not make a precipitate, of which sodium carbonate, sodium bicarbonate, sodium hydroxide, potassium hydroxide, ammonium hydroxide, borax or ammonium carbonate are examples. Preferably the quantity added will be sufficient to give pH within the range 7.0 to 7.3.

To this neutralized concentrate of sulphite liquor a suitable hygroscopic agent may be added, which may be 5 to 20 per cent, based on total solids in the concentrate, of glycerine, ethylene-glycol, diethylene glycol, sorbitol or the like, to maintain a predetermined moisture content in the ultimate composition. The amount of moisture wanted in the finished product will vary according to the degree of flexibility desired in the work to which the glue is applied. For the various ordinary uses, and under ordinary circumstances, moisture content within the range of 3%–20% is found satisfactory. Both the hygroscopic agent and the moisture maintained by presence of that agent contribute to the ultimate flexibility of the product.

In this intermediate state the concentrate is subject to fungus attack from germs in atmospheric air, which, I believe, has not hitherto been known to be of consequence in the direction above indicated.

The invention, by introducing a suitable fungicide, stabilizes the composition against the chemical changes and deterioration which otherwise would result. The fungicide is an inhibitor having the compound effect of eliminating deterioration and obnoxious odor.

Any suitable fungicide may be introduced, a quantity of ½ to 3 per cent, being ordinarily sufficient. Optimum results are had with non-volatile fungicides—such as sodium chlor-orthophenylphenate, sodium orthophenylphenate, sodium pentachlorphenate, or sodium-2-4-5 trichlorphenate. If other fungicides are employed there may be a slow loss of the fungicide throughout a period of months so that a glued joint which at first responds satisfactorily to tests ultimately will become unsatisfactory.

Water may be eliminated by evaporation or otherwise, or may be added, to make the ultimate product have desired viscosity. The completed adhesive is thermoplastic, homogeneous and pliable, and because of its inhospitability to fungus life it has superior properties for permanence of adhesion as a glue, and for use as a sizing or stiffener.

It will be understood that the various steps can be carried out without preliminary concentration of the blown-down liquor, or at any desired degree of concentration, those mentioned above being what have been found of optimum convenience.

I claim as my invention:

1. An adhesive consisting of a water-soluble concentration of acid blown-down liquid of the sulphite process of paper manufacture, being non-acid and approximately neutral; combined with a hygroscopic agent, and moisture held thereby, giving flexibility to the permanent form of the adhesive; and a non-volatile water-miscible sodium phenyl-phenate salt.

2. A water-soluble composition as in claim 1, within the pH range 7.0 to 7.3.

3. A water-soluble composition as in claim 1, wherein the fungicide is one selected from the group consisting of sodium chlororthophenylphenate, sodium orthophenylphenate, sodium pentachlorphenate and sodium 2-4-5 trichlorphenate.

4. A process of making a water-soluble composition of the class described which comprises the neutralizing of acid blow-down liquor of the sulphite process of paper manufacture, at least to non-acidity, by an alkalizing agent which does not react chemically with the concentrate to make a precipitate; introducing a hygroscopic agent, and thereby introducing moisture; and preventing the developing of acidity by introducing a non-volatile water-miscible sodium phenate as an inhibitor of fungus life; and maintaining the mixture free from introduction of adhesive of animal origin.

5. A process as in claim 4 wherein the neutralizing is by an alkalizing agent selected of a class of reagents whose reaction product with the blow-down liquor is soluble therein.

BRADFORD S. RITCHIE.